US011276333B2

(12) United States Patent
Yildiz et al.

(10) Patent No.: US 11,276,333 B2
(45) Date of Patent: Mar. 15, 2022

(54) DETERMINATION OF PARAMETERS FOR USE OF AN OUTDOOR DISPLAY UNIT

(71) Applicant: FIREFLY SYSTEMS INC., San Francisco, CA (US)

(72) Inventors: Vedat Taylan Yildiz, San Mateo, CA (US); Anastasios Noulas, Larissa (GR); Yasin Açikmeşe, Istanbul (TR); Anil Suren, Corte Madera, CA (US); Kaan Gunay, San Francisco, CA (US); Onur Kardesler, San Francisco, CA (US)

(73) Assignee: FIREFLY SYSTEMS INC., San Francisco, CA (US)

( * ) Notice: Subject to any disclaimer, the term of this patent is extended or adjusted under 35 U.S.C. 154(b) by 0 days.

(21) Appl. No.: 16/941,367

(22) Filed: Jul. 28, 2020

(65) Prior Publication Data

US 2022/0036770 A1 Feb. 3, 2022

(51) Int. Cl.
*G06F 9/00* (2006.01)
*G09F 9/30* (2006.01)
(Continued)

(52) U.S. Cl.
CPC .............. *G09F 9/30* (2013.01); *G01C 21/00* (2013.01); *G01C 21/005* (2013.01);
(Continued)

(58) Field of Classification Search
None
See application file for complete search history.

(56) References Cited

U.S. PATENT DOCUMENTS

| 6,812,851 B1 * | 11/2004 | Dukach | G08G 1/01 340/815.4 |
| 6,850,209 B2 * | 2/2005 | Mankins | G09F 21/04 345/1.3 |

(Continued)

OTHER PUBLICATIONS

Dikaiakos, Marios D., et al. "Location-aware services over vehicular ad-hoc networks using car-to-car communication." IEEE Journal on Selected Areas in Communications 25.8 (2007): 1590-1602. (Year: 2007).*

(Continued)

*Primary Examiner* — Gurkanwaljit Singh
(74) *Attorney, Agent, or Firm* — Maschoff Brennan

(57) ABSTRACT

The present disclosure generally relates to determining parameters of use for an outdoor display unit, such as a mobile display unit, including for example a geographic area for use, a time/day of use, and/or information to be displayed by the outdoor display unit. Parameters of use may be determined based on use characteristics, including results, associated with information displayed by an outdoor display unit in a first geographic area having characteristics determined to be similar to those of a second geographic area. For example, the geographic areas may share one or more similar spatio-temporal aspects with one another. Based on these spatio-temporal aspects, a day/time when characteristics of the second geographic area are similar to those of the first geographic area may be identified. Information displayed at the second area may be determined based on the use characteristics, and the determined information may be displayed at the identified day/time.

20 Claims, 4 Drawing Sheets

(51) Int. Cl.
*G09F 21/04* (2006.01)
*G01C 21/00* (2006.01)
*G06Q 30/02* (2012.01)
*G06F 3/14* (2006.01)

(52) U.S. Cl.
CPC ......... *G06Q 30/0201* (2013.01); *G09F 21/04* (2013.01); *G06F 3/14* (2013.01)

(56) References Cited

U.S. PATENT DOCUMENTS

| | | | | |
|---|---|---|---|---|
| 9,715,233 | B1* | 7/2017 | Mandeville-Clarke | ..................... H04W 4/029 |
| 10,679,448 | B2* | 6/2020 | Koo | ....................... G06Q 10/00 |
| 2002/0009978 | A1* | 1/2002 | Dukach | ................. G08G 1/127 455/99 |
| 2002/0084891 | A1* | 7/2002 | Mankins | ................. B60Q 1/50 340/425.5 |
| 2002/0111146 | A1* | 8/2002 | Fridman | ............. B60Q 1/2611 455/99 |
| 2002/0112026 | A1* | 8/2002 | Fridman | ................ G08G 1/127 709/217 |
| 2010/0306249 | A1* | 12/2010 | Hill | ....................... G06Q 50/01 707/769 |
| 2013/0325779 | A1* | 12/2013 | Shahshahani | ............ G06N 5/00 706/46 |
| 2014/0081652 | A1* | 3/2014 | Klindworth | ............ G16H 40/20 705/2 |
| 2016/0048369 | A1* | 2/2016 | Zenoff | .................. G06F 3/1454 715/734 |
| 2017/0235848 | A1* | 8/2017 | Van Dusen | ............. G06F 30/20 705/12 |
| 2018/0350144 | A1* | 12/2018 | Rathod | ................. A63F 13/216 |
| 2019/0355190 | A1* | 11/2019 | Koo | ....................... G07C 9/257 |

OTHER PUBLICATIONS

Lee, Uichin, and Mario Gerla. "A survey of urban vehicular sensing platforms." Computer Networks 54.4 (2010): 527-544. (Year: 2010).*
Xu, Heng, Lih-Bin Oh, and Hock-Hai Teo. "Perceived effectiveness of text vs. multimedia Location-Based Advertising messaging." Int. J. Mobile Communications 7.2 (2009). (Year: 2009).*

* cited by examiner

DETERMINATION OF PARAMETERS FOR USE OF AN OUTDOOR DISPLAY UNIT

The present disclosure generally relates to display units configured to display information in an outdoor setting. More particularly, but not exclusively, the present disclosure relates to determining parameters for use of an outdoor display unit, such as a mobile display unit, including for example a geographic area for use, a time/day of use, and/or information or content to be displayed by the outdoor display unit.

BACKGROUND

Unless otherwise indicated herein, the materials described herein are not prior art to the claims in the present application and are not admitted to be prior art by inclusion in this section.

Various display units may be used in an outdoor setting to provide information to people coming into contact with the display unit. The display units may be stationary such that information from the display units may be provided to people who move into visible range of the display units. The display units may also be mobile such that the display units may be moved to a number of different geographic locations. For example, a mobile display unit may be mounted to a vehicle which may move the mobile display unit to different geographic locations. In the case of mobile display units, information from the display unit may be provided to people who move into visible range of the display unit or it may be provided to people to whom the display unit is moved into their visible range.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one embodiment, a method includes identifying use characteristics of at least one mobile display unit displaying information in a first geographic area. The at least one mobile display unit may be configured to display information in an outdoor environment and the first geographic area may have a first set of characteristics associated therewith. The method also includes determining, based on the first set of characteristics associated with the first geographic area, at least a second geographic area. The second geographic area may have a second set of characteristics associated therewith that is at least partially similar to the first set of characteristics associated with the first geographic area. The method further includes determining, based on the identified use characteristics of the mobile display unit in the first geographic area, information to be displayed by a mobile display unit in the second geographic area.

In another embodiment, a system includes one or more processors and one or more non-transitory computer-readable media containing instructions. In response to being executed by the one or more processors, the instructions cause the system to perform operations including identifying use characteristics of at least one mobile display unit displaying information in a first geographic area, where the at least one mobile display unit is configured to display information in an outdoor environment and the first geographic area has a first set of characteristics associated therewith; determining, based on the first set of characteristics associated with the first geographic area, at least a second geographic area, where the second geographic area has a second set of characteristics associated therewith that is similar to the first set of characteristics associated with the first geographic area; and determining, based on the identified use characteristics of the mobile display unit in the first geographic area, information to be displayed by a mobile display unit in the second geographic area.

In still another embodiment, one or more non-transitory computer-readable media contain instructions which, in response to being executed by one or more processors, cause a system to perform operations including identifying use characteristics of at least one mobile display unit displaying information in a first geographic area, where the at least one mobile display unit is configured to display information in an outdoor environment and the first geographic area has a first set of characteristics associated therewith; determining, based on the first set of characteristics associated with the first geographic area, at least a second geographic area, where the second geographic area has a second set of characteristics associated therewith that is similar to the first set of characteristics associated with the first geographic area; and determining, based on the identified use characteristics of the mobile display unit in the first geographic area, information to be displayed by a mobile display unit in the second geographic area.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict one non-limiting typical embodiment of the invention and are therefore not to be considered limiting of its scope. The invention will be described and explained with additional specificity and detail through the use of the accompanying drawings in which.

DETAILED DESCRIPTION

Figure 1:
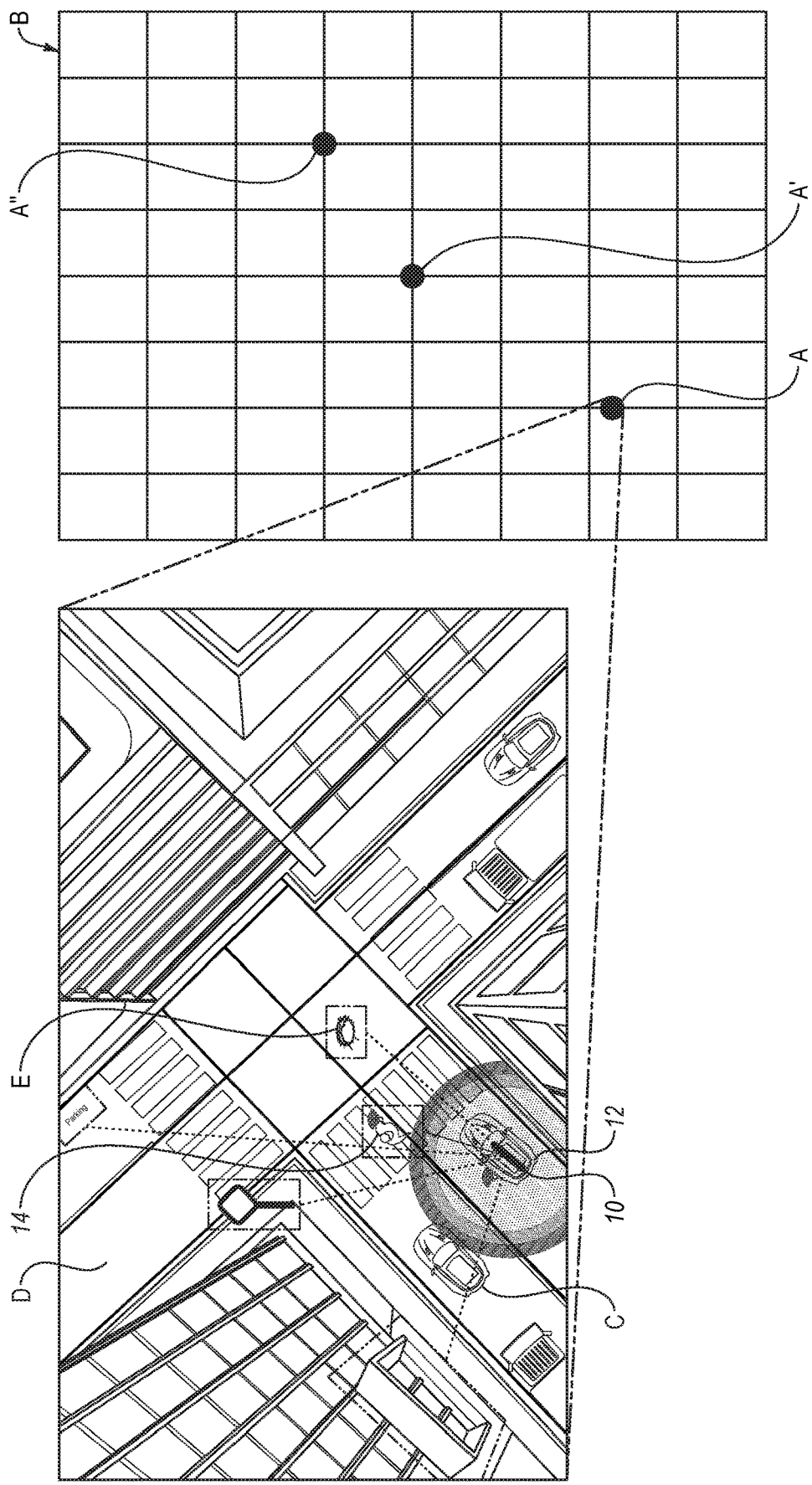
FIG. 1 is a schematic illustration of an outdoor display unit mounted to a vehicle in a geographic area.

The present disclosure generally relates to determining parameters of use for an outdoor display unit, such as a mobile display unit, including for example a geographic area for use, a time/day of use, and/or information to be displayed by the outdoor display unit. Parameters for use may be determined based on use characteristics, including results, associated with information displayed by an outdoor display unit in a first geographic area having characteristics determined to be similar to those of a second geographic area. For example, the geographic areas may share one or more similar spatio-temporal aspects with one another. Based on these spatio-temporal aspects, a day/time when characteristics of the second geographic area are similar to those of the first geographic area may be identified. Information to be displayed at the second area may be determined based on the use characteristics, and the determined information may be displayed at the identified day/time.

Outdoor display units may provide a variety of information, including for example road conditions, weather conditions, emergency alerts, and notices relating to goods, services, and events, amongst other things. Determining the effectiveness of outdoor display units, and the areas in which they should be used, may be challenging. For example, mobility data shows that urban areas change significantly in terms of activity and crowds depending on time and/or day of the week, amongst other factors. As a result, many areas have dynamic spatio-temporal characteristics or aspects associated therewith.

Implementation of outdoor display units may be planned based on geodemographic data sets such as publicly available official statistics, like a governmental census, or commercial equivalents. However, geodemographic data provided by these sources are typically restricted and are usually collected at a low temporal frequency. As a result, this data may not accurately represent daily mobility flows at a scale which provides the ability to plan implementation of outdoor display units with better effectiveness. Similarly, use of this data may make it difficult to effectively target individuals with an outdoor display unit when the individuals who may be exposed to the outdoor display unit routinely change throughout the day and week.

Geodemographic data sets may also fail to provide information relating to interests of individuals who may be exposed to a mobile display unit at a particular geographic area or location. These interests may be inferred from market research, but this approach is not always accurate and while surveys may be conducted, they can be costly and have sampling issues, amongst others.

Similarly, without a robust approach for determining areas where certain information or content should be displayed by an outdoor display unit, it may be challenging to provide information from an outdoor display unit in a manner effective for yielding a desired end result. As a corollary, without such information, it may be difficult to change aspects of the display unit including its location and characteristics thereof in order to produce more effective and greater exposure to the information provided by the display unit, thereby increasing the likelihood that people may not be exposed to potentially important information provided by the display unit.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

As indicated above, the present disclosure generally relates to the determination of parameters of use for an outdoor display unit, such as a mobile display unit, including for example a geographic area for use, a time/day of use, and/or information to be displayed by the outdoor display unit. The determination may be based on a variety of information relating to different geographic areas where a mobile display unit is and/or may be used. With reference to FIG. 1 for example, a mobile display unit 10 is mounted to a vehicle 12 which, in turn, is located in geographic area A. In the illustrated form, the geographic area A is located within a representative geographic region B which is in the form of a gridwork which may, for example, be representative of intersecting streets in a city or town defining city blocks. Similarly, the geographic region B may be representative of a city or town, or a portion of a city or town, although other possibilities are contemplated. The vehicle 12 may move the mobile display unit 10 in or to different geographic areas, including geographic areas A' and A" noted in FIG. 1, within the geographic region B. A different mobile display unit 10 may also be moved in or to one or both of geographic areas A' and A" by a different vehicle. Other forms in which the mobile display unit 10 or another mobile display unit may be moved out of the geographic region B by the vehicle 12 or another vehicle are also possible.

In FIG. 1, the geographic area A is representative of an area surrounding an intersection of streets C and D. In one form for example, the geographic area A may be representative of a certain distance along the streets C and D within their intersection. For example, the geographic area A may be representative of a city block or a portion of a city block extending in all directions from the intersection of streets C and D. In other forms, the geographic area A may be representative of several city blocks, a zip code, a cultural district like an arts or theatre district, a commercial district such as a banking district or a shopping district, or an entertainment district including the presence of a large number of bars, nightspots, restaurants, and/or sporting venues. The geographic area A may additionally or alternatively be representative of an area surrounding a particular point of interest, such as a particular store or marketplace. The geographic area may also be representative of other areas, and the areas A' and A" may be representative of the same or different areas represented by the geographic area A.

Data relating to characteristics of the geographic area A, as well as the geographic areas A' and A", may be identified and collected through a number of sources. It should be appreciated that various characteristics of a geographic area may be static while others may be dynamic. For example, the number and types of buildings, commercial enterprises, housing, intersections, traffic signals, land use, population density and socio-economic characteristics, amongst other things, of a geographic area may be static or at least somewhat static. In contrast, characteristics like weather and pedestrian presence may be rather dynamic and depend on other characteristics of the geographic region A. For example, the number of pedestrians or individuals present in the geographic region A who may be exposed to the mobile display unit 10 may depend on a number of factors like the time of day, the day of the week, and/or local events that are occurring in or around the geographic region A, just to provide a few examples.

The number of pedestrians or individuals present in the geographic region A who may be exposed to the mobile display unit 10 at or within a certain time or time period may also depend on what is present at the geographic region A. For example, if the geographic region A has a large number of restaurants, theaters, and/or nightlife spots, then the number of pedestrians or individuals present in the geographic region A who may be exposed to the mobile display unit 10 may be higher in the evening and nighttime hours than during the morning or afternoon. In contrast, if the geographic region A has a large number of schools or childcare centers, then the number of pedestrians or individuals present in the geographic region A who may be exposed to the mobile display unit 10 may be higher in the morning and afternoon hours than during the evening or nighttime hours.

The mobile display unit 10 may be used to identify and collect data relating to various characteristics of the geographic area A, as well as the geographic areas A' and A". For example, the mobile display unit 10 may include one or more components configured to provide information related to a geographic area in which the mobile display unit 10 is present. For example, the mobile display unit 10 may include one or more global positioning system (GPS) devices that provide the geographic position or location of the mobile display unit 10. Additionally or alternatively, the geographic position or location of the mobile display unit 10 may be provided by one or more GPS devices associated with the vehicle 12, or the location information may come from street level image data which is obtained by a camera mounted on the mobile display unit 10 and processed to determine the location of the vehicle 12. In one or more embodiments, the geographic position or location of the mobile display unit 10 may be provided by information received from an electronic device (e.g., a cellular phone, a tablet, a laptop, a vehicular computing system, etc.) of an operator of the vehicle 12.

With the location of the mobile display unit 10 known, additional details regarding characteristics of the geographic area A like the types of buildings present, population density, businesses present, quality characteristics of features in the geographic area A which may be indicative of socio-economic status of the geographic area A, etc. may be determined. For example, the location information could be cross-referenced with publicly available information to determine these characteristics, and/or image data obtained from a camera mounted on the mobile display unit 10 may be parsed to determine these characteristics. In one form, a camera mounted on the mobile display unit 10 may be capable of capturing a 360-degree view of the area surrounding the mobile display unit 10.

The mobile display unit 10 and/or the vehicle 12 may include additional sensors for determining other characteristics of the geographic area A. For example, these additional sensors may include air quality sensors, humidity sensors, temperature sensors, ambient light sensors, noise sensors, WiFi detection sensors, Bluetooth detection sensors, and/or accelerometers. By way of non-limiting example, the WiFi and Bluetooth detection sensors may identify WiFi and Bluetooth signals around or near the mobile display unit 10 which may be used in estimating the number of people who may be exposed to the mobile display unit 10 at a given time. The air quality, humidity, and temperature sensors may be used to determine the weather at the geographic area A at a given time or period of time, and the accelerometer may be used to determine traffic congestion or road conditions by sensing features such as pothole E. In addition to or in lieu of being mounted on the mobile display unit 10 and/or the vehicle 12, one or more of these and other sensors may be positioned at different locations within the geographic area A to sense similar conditions in the geographic area A.

It may also be possible to estimate the number of individuals or people 14 positioned within a predefined or predetermined distance of the mobile display unit 10. In one non-limiting form, the size or length of the predetermined distance may correspond to a maximum distance and angle at which a person could view and/or read the information provided on the screen of the mobile display unit 10. These individuals may include (e.g., are in possession of and/or using) portable electronic devices which facilitate unique identification of their location and proximity to the mobile display unit 10. Similarly, based on this information, it is possible to quantitatively determine the number of the individuals 14 who are within the predetermined distance of the mobile display unit 10 at a given location and who have associated portable electronic devices that allow identification of their respective locations. In one form, the individuals who include a portable electronic device that provides information facilitating the identification of their location within the predetermined distance of the mobile display unit 10 may be identified through a unique mobile advertising ID (MAID) such as an IDentifier for Advertisers (IDFA) or an AAID (Google/Android Advertising ID).

The information facilitating identification of location may come from sources other than MAIDs as well. For example, it may come from any type of device identifier that is tied to the location of the portable electronic device. Regardless of their form, the device identifier may originate from a software developer kit (SDK) app integration or from a restful API, amongst other possibilities. While not previously discussed, it should be appreciated that there may be individuals close to the mobile display unit 10 who do not include portable electronic devices that provide information facilitating the identification of their location within the predetermined distance of the mobile display unit 10, or their portable electronic devices may not be providing this particular information at that certain point in time when they are within the predetermined distance of the mobile display unit 10. Further details regarding an approach for estimating these individuals is disclosed in U.S. patent application Ser. No. 16/909,329 filed Jun. 23, 2020, the contents of which are incorporated herein by reference in their entirety.

It may also be possible to determine if individuals look directly at the mobile display unit 10, their reaction thereto, and/or demographic details like gender and age. For example, image information obtained from a camera associated with the mobile display unit 10 may be parsed with facial recognition software to identify individuals who specifically look at the mobile display unit 10 for a predetermined period of time. This information may, for example, be considered representative of the number of individuals within the predetermined distance of the mobile display unit 10 who actually look at the information provided thereby. The facial recognition software, either alone or in combination with software configured to recognize body language, may also identify emotions of those who look at the mobile display unit 10 based on different facial expressions and/or body language. For example, the facial recognition software may determine the number of individuals who look at the mobile display unit 10 and smile, the number of individuals who look at the mobile display unit 10 and frown or scowl, and or the number of individuals who look at the mobile display unit 10 and point, shrug, or wave. In addition, the photos and/or videos may be analyzed to also identify various demographic details of individuals such as, for example, gender and estimated age, and they may also be analyzed to assess potential identifiers of socio-economic status of individuals such the value or quality of apparel, jewelry, or accessories associated with the individuals.

In view of the foregoing, it should be appreciated that collection of sufficient data relating to various characteristics of a particular geographic area may provide a spatio-temporal overview of the geographic area, such that it may be possible to determine or estimate certain characteristics of the geographic area at, for example, a particular time on a given day. For example, if a mobile display unit 10 is located in a geographic area at a certain time on a given day, then it may be possible to estimate the number of people in the geographic area. As another example, if it is desired to use a mobile display unit 10 in a geographic area when certain characteristics of the geographic area are present, such as certain demographics of individuals who may be exposed to the mobile display unit 10, then a day and time when these characteristics are present may be identified and establish when the mobile display unit 10 should be deployed to the area.

In addition to obtaining data relating to various characteristics of a certain geographic area, it is also possible to obtain data relating to use characteristics of the mobile display unit 10 in a certain geographic area. For example, the day and time when the mobile display unit 10 is used, and/or the information or content displayed by the mobile display unit 10, may be identified and saved. With this information, and the other information discussed above, it may be possible to determine the effectiveness of a mobile display unit 10 at a geographic area, on a certain day and at a particular time or range of times, in producing actions which are desired or intended by the information displayed by the mobile display unit 10.

For example, a particular retailer in a geographic region may indicate that they experienced increased sales around a time when a mobile display unit 10 was present and displaying information relating to the retailer. To the extent the information displayed by the mobile display unit 10 was intended to increase sales, then the resulting increase in sales may be indicative that use of the mobile display unit 10 to display information relating to the retailer in the geographic area was effective in achieving the desired end result. As another example, a mass transit provider in a geographic region may indicate that use of mass transit increased around, including after for example, a time when a mobile display unit 10 was present and displaying information encouraging use of mass transit. To the extent the information displayed by the mobile display unit 10 was intended to increase use of mass transit, then the resulting increase in use of mass transit may be indicative that use of the mobile display unit 10 to display information relating to mass transit in the geographic area was effective in achieving the desired end result.

The information relating to use characteristics of the mobile display unit 10 may be stored and correlated with the information relating to characteristics of the geographic area described above and provide a basis upon which to identify the characteristics of the geographic area which were present when use of a mobile display unit 10 was effective. Similarly, this information may be used to identify the time and day, amongst other factors, when a mobile display unit 10 may be used in a particular area with an expectation that similar effectiveness would result if the mobile display unit 10 displayed the same or similar information. Regarding the latter for example, if the initial information provided by the mobile display unit 10 related to a particular luxury item, then it could be assumed that the similar display of information relating to a different luxury item by a mobile display unit 10 might also be similarly effective.

With the foregoing information, including one or more of use characteristics of the mobile display unit 10 such as the day/time and effectiveness of its use, the geographic area of its use, and characteristics of the geographic area, a different geographic area having similar characteristics at some point in time, and as such where use of the mobile display unit 10 may likely be effective based on results of use of a mobile display unit 10 in the other area, may be determined or identified. In addition, information or content which may be displayed by a mobile display unit 10 at the different geographic area may also be determined or identified based on what information was effectively displayed earlier at the other geographic area.

It should be appreciated that the different geographic areas may have similar characteristics at different points in time. As such, a day/time at which the mobile display unit 10 should be used at the different geographic area may also be identified, and this day/time may not be the same as the day/time when the mobile display unit 10 was used at the other geographic area. Similarly, knowing the spatio-temporal characteristics of different geographic areas, these characteristics may be compared to identify geographic areas which have similar characteristics at some point in time.

Determination of the similar geographic areas may be based on a number of factors. For example, it may be based on any one or a combination of identifying one characteristic that has a high similarity between the areas or a number of characteristics having moderate or high similarity between areas. The particular characteristic(s) for which similarity is identified may vary from case to case and may, for example, depend on the information which will be provided by a mobile display unit 10. For example, if a mobile display unit 10 will provide information relating to a luxury product, then similarities between characteristics relating to socio-economic status and/or demographic data may be used to identify similar geographic areas if it is determined these factors matter most.

In one form, geographic areas having similar characteristics could be identified and then the use characteristics of a mobile display device 10 in one or both areas may be analyzed to determine if certain information displayed in one of the areas was done so effectively. If so, it may be determined that information, or similar information, should be displayed in the other geographic area based on similar characteristics of the geographic areas. For example, it may be determined that a first geographic area has similar characteristics to a second geographic area. These geographic areas may be near one another in the same city, or they may be found in different cities for example. If information relating to a public health initiative was effectively provided by a mobile display unit 10 in the first geographic area, then it may be determined that the same or similar public health information should be displayed by a mobile display unit 10 in the second geographic area.

In another form, it may be desired to expand the geographic areas in which information previously and effectively displayed by a mobile display unit 10 in one geographic area is displayed. In this form, a different geographic area having similar characteristics may be determined and identified as a potential area for expanding display of the information. For example, a content provider may have provided information relating to a public health initiative that was effectively displayed by a mobile display unit 10 at a first geographic area. If the content provider desires to effectively expand display of the information relating to the public health initiative to a different geographic area, then the first geographic area may be compared to a number of different geographic areas in order to determine a number of geographic areas which have at least some similar characteristics, and the number of areas may be identified to the content provider as potential geographic areas for expansion where a desired effectiveness is more likely.

Figure 2:
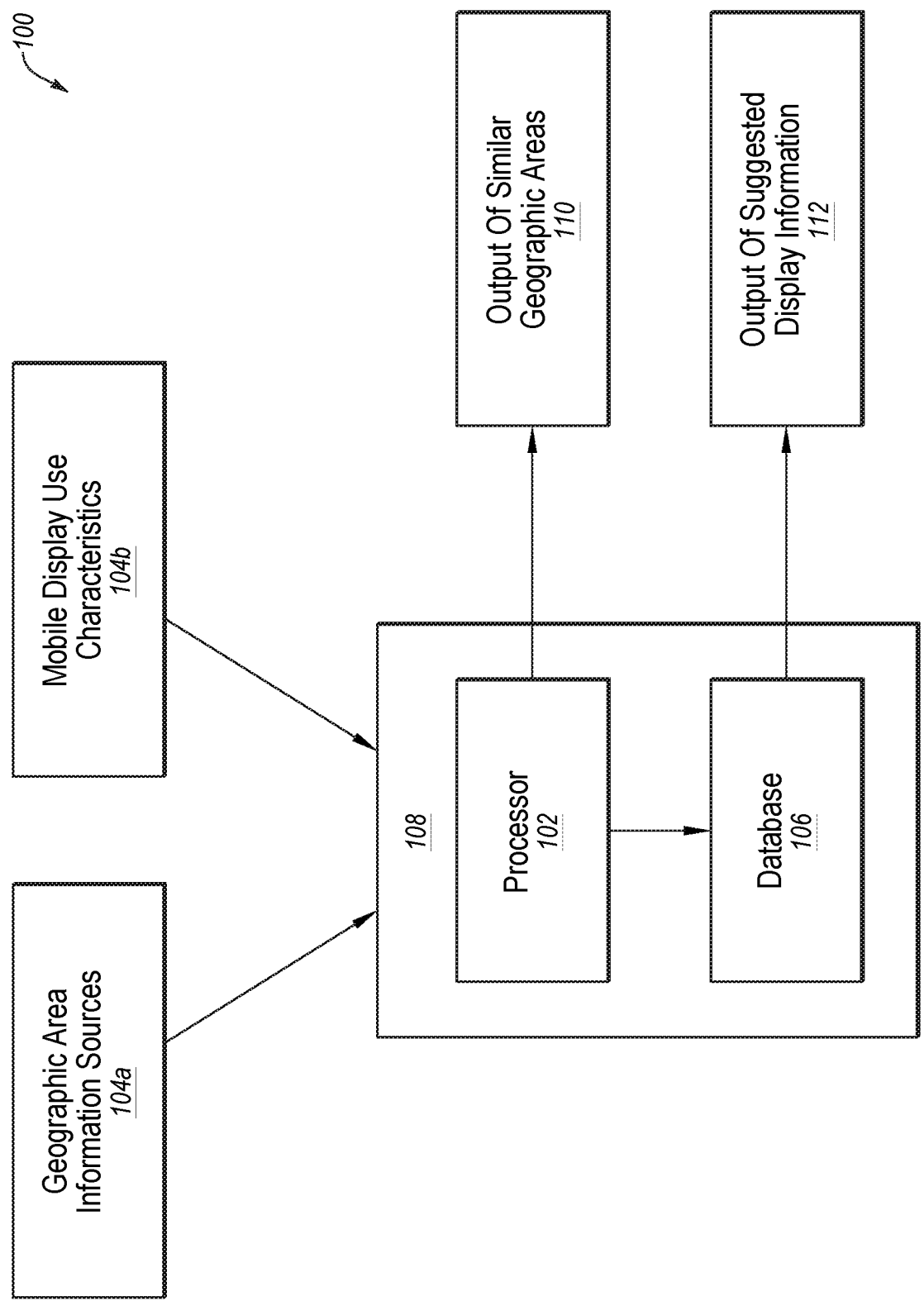
FIG. 2 is a schematic illustration of a system for determining parameters of use for a mobile display unit.

With reference now to FIG. 2, there is provided a schematic illustration of a system 100 for determining parameters of use for a mobile display unit 10, including for example a geographic area for its use, a time/day of it should be used, and/or information to be displayed thereby. It should be understood that the following description may be relevant to obtaining information relating to a number of different geographic areas and/or the use of a number of mobile display units 10 at a variety of different locations.

While not specifically identified, the system 100 may include a network which may be configured to communicatively couple components and devices internal and external to the system 100. As such, in some embodiments, components and devices of the system 100 may interact with each other and other devices and components via the network.

In some embodiments, the network may include a short-range wireless network, such as a wireless local area network (WLAN), a personal area network (PAN), or a wireless mesh network (WMN). For example, the network may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, among other types of LANS, PANS, and WMNS. In these or other embodiments, the network may include a wide area network (WAN) that may extend over a relatively large geographic area as compared to the geographic area that may be covered by a short-range wireless network. In some embodiments, the network may have numerous different configurations. In some embodiments, the network may include a peer-to-peer network.

Additionally or alternatively, the network may also be coupled to or may include portions of a telecommunications network for sending data in a variety of different communication protocols. In some embodiments, the network may include an Internet Protocol (IP) based network such as the Internet. In some embodiments, the network may include cellular communication networks for sending and receiving communications and/or data including via hypertext transfer protocol (HTTP), direct data connection, wireless application protocol (WAP), etc. The network may also include a mobile data network that may include third-generation (3G), fourth-generation (4G), fifth-generation (5G), long-term evolution (LTE), long-term evolution advanced (LTE-A), Voice-over-LTE, Voice-over-IP, or any other mobile data network or combination of mobile data networks.

In the system 100, a computing system 102 may receive information relating to characteristics of a number of different geographic areas, including for example the geographic area A, A' and A", and characteristics of use of one or more mobile display units 10 at a given day and time from a variety of different sources. The computing system 102 may process the information for storage in a database 106 which may be hosted on a remote server 108 with the computing system 102.

In the system 100, the sources 104a may correspond to those identified above which provide information or data relating to characteristics of each geographic area across a spectrum of time in order to provide a spatio-temporal overview of the different geographic areas. The sources 104a may include, for example, GPS sensors, cameras, air quality sensors, humidity sensors, temperature sensors, ambient light sensors, noise sensors, WiFi detection sensors, Bluetooth detection sensors, and/or accelerometers. The sources 104a may also include databases having relevant information such as population density, zoning data, socioeconomic factors, and demographics, amongst others, relating to each of the different geographic areas.

The computing system 102 may be configured to analyze some or all of the information provided by the sources 104a. For example, the computing system 102 may analyze photos and/or videos provided by a camera to determine various characteristics of a geographic area, including for example the types of businesses present or the number of individuals exposed to a mobile display unit 10, just to provide a few examples. The computing system 102 may execute software configured to determine these characteristics, or a person may analyze the photos and/or videos to determine these characteristics and then provide related information to the computing system 102 through a suitable input device (not shown) such as a keyboard or mouse. In either case, the resulting information may be organized and stored in the database 106.

The computing system 102 may also execute facial recognition software to identify a number of individuals that specifically look at the mobile display unit 10 for a predetermined period of time. This information may, for example, be considered representative of the number of individuals who actually look at the information provided by a mobile display unit 10. The facial recognition software, either alone or in combination with software configured to recognize body language, may also identify emotions of those who look at a mobile display unit 10 based on different facial expressions and/or body language. For example, the facial recognition software may determine the number of individuals who look at a mobile display unit 10 and smile, the number of individuals who look at a mobile display unit 10 and frown or scowl, and or the number of individuals who look at a mobile display unit 10 and point, shrug, or wave. In addition, analysis of the photos and/or videos by the computing system 102 may also identify various demographic details of individuals including for example gender and estimated age. After relevant analysis, the data obtained from the sources 104a may be stored in the database 106.

The sources 104a may also include third party sources that provide information which may be used to determine various characteristics of a geographic area. For example, the third-party sources may include movie theatres, auditoriums, concert venues, or sports stadiums, just to provide a few examples, that provide information relating to the total number of people attending an event at a respective location at a particular time. With this information, assumptions may be made relating to the total number of people outside of and/or around the respective location at various times including a window of times before the beginning of the event and a window of time at the end of the event. Similarly, the total number of people outside the respective location at a given time may be useful in determining an estimated number of individuals in a geographic area who may be exposed to a mobile display unit 10.

The third-party sources may also provide information relating to the unique device identifiers associated with individuals which may be exposed to a mobile display unit 10. In one form for example, a source of this nature may be a location-based marketing analytics provider, although other variations are possible. For example, location-technology platforms, mobile applications that collect information on the whereabouts or location of mobile users, cellular providers, or other sources such as location data providers may also provide information relating to individuals which may be exposed to a mobile display unit 10. The computing system 102 may analyze the information provided by one or more of these sources and store it in the database 106 in association with the information stored in the database 106 that is obtained from the other sources 104a. The third-party sources may also provide information relating to the weather at each geographic location at the time (or within some range thereof) when the information from the other sources 104a is obtained. The computing system 102 may analyze the information provided by such a source and store it in the database 106 in association with the information stored in the database 106 that is obtained from the other sources 104a.

A number of sources 104b may provide information relating to use characteristics of a number of mobile display units 10. This information may include data relating to when and where each mobile display unit 10 is used, the information or content displayed by each mobile display unit 10, and the effectiveness of each mobile display unit 10 at a geographic area. The computing system 102 may also be configured to determine the effectiveness of each mobile display unit at a geographic area when, for example, the sources 104b provide relevant information for doing so. For example, one or more of the sources 104b may provide information relating to sales or store visits, amongst others, associated with times when a mobile display unit displays related information at a geographic area.

The data information collection described in connection with the system 100 may be repeated a number of times for a given geographic area. As additional data is collected, a more accurate representation of spatio-temporal characteristics of a given geographic area may be provided. This representation may be subsequently used for determining similarities between geographic areas to identify geographic areas where use of a mobile display unit 10 may be effective.

As indicated above, the system 100 may also determine geographic areas that have similar characteristics and may also determine information or content that should be displayed by a mobile display unit 10 in different geographic areas having similar characteristics. The determination of geographic areas having similar characteristics may be performed through a variety of different approaches. Similarly, the approaches described herein are mere examples and should not be viewed as limiting or exhaustive.

With the information relating to characteristics of a geographic area as discussed, a geographic area may be defined by a set of spatial topological boundaries which may effectively segment the area to distinct items, although overlapping area segments are also possible. Moreover, with this information, a geographic area may be observed in a sequence of time windows. Using these space and time characterizations, spatio-temporal segments may be obtained, and each segment can be represented as a vector of a certain dimensionality 'd', which is simply a mathematical formulation for a sequence of 'd' numbers. These numbers may represent a subset of the information relating to characteristics of a geographic region as described above including, but not limited to, information about time, the spatial index of an area, the demographic makeup of individuals who may be exposed to a mobile display unit 10 in the area, socio-economic indicators in the area, and/or weather conditions. The encoding of categorical variables in this context is also possible to obtain symbolic numerical representations of data that are not inherently numerically described.

Given two spatio-temporal characteristics of different areas at selected time windows, a similarity/distance score between those may be measured to allow comparisons between the geographic areas. Using a similarity metric for example, a pair of spatio-temporal segments, and their respective vector representations as inputs, a measurement of how similar they are with one another may be performed. Similarly, with the information relating to different characteristics of geographic areas as described above, the similarity of one area can be measured relative to all other areas for which this information is known. Such information may be collected and organized in similarity (or affinity) matrices.

Following calculation of similarity scores, characteristics of different geographic areas could be ranked to provide a "recommendation list" to a content provider of a mobile display unit 10 who can then decide to extend and grow their campaign to these new areas, times and audiences. A threshold k can typically be applied to limit the number of recommendations. As an example, the top-k items can be recommended to a content provider with k typically being decided according to a user interface in place. The threshold k can also be decided dynamically by setting a similarity tolerance value suggesting that items who are less similar than that tolerance value to the target area, should simply be discarded. The latter could be due to the fact that recommending less similar areas will be less effective in efficiency terms and hence less desirable for use to the content provider. In this setting, a natural solution that would automatically accommodate the requirement for obtaining a set of similar items, while at the same time effectively applying varying thresholds (the threshold k could vary from one area to another), would be the use of a clustering algorithm. Such an algorithm could use as input a spatio-temporal item similarity matrix described above and output a set of groupings (clusters) where each grouping is a set of similar items. An non-limiting comparative illustration of clusters of similar areas in a geographic region such as a city, with different colors showing areas which are similar, may be found in Noulas et al. (2011). "Exploiting Semantic Annotations for Clustering Geographic Areas and Users in Location-based Social Networks". *Fifth International AAAI Conference on Weblogs and Social Media.*

One type of algorithm having flexibility and effectiveness which may be used is Spectral Clustering. Spectral Clustering is provided with a similarity (affinity) matrix as input such as W. This matrix is used to generate the graph Laplacian L where L is set as $L:=I-1/D-W$ where D is the diagonal matrix whose diagonal cell $d\_ii$ is equal to the sum of similarity of item i to all other items j. An operation on the Laplacian is applied to extract its spectrum (eigenvalues). The largest eigenvalues are the most important, carrying most of the information encompassed through the given matrix representation, and these values can be used now to represent each row in the matrix (clustered item) to a lower dimensional embedding. This new embedding allows for the effective application of standard clustering algorithms, such as k-means for example, that would otherwise yield undesirable results, when applied to the initial row data representations of the clustered items.

While not previously indicated, it should be understood that the computing system 102 may be configured to execute one or more of the foregoing approaches for assessing similarities between different geographic areas. Once the computing system 102 determines geographic areas are similar, or that characteristics therebetween are at least partially similar, an output 110 may be provided which identifies the similar geographic areas. The output 110 may identify all areas within a region which are similar as shown in the comparative illustration of Noulas et al. referenced above, or it may identify two or more discrete areas which are similar as also shown in a different illustrative comparison of Noulas et al. for example. However, it should be appreciated that other variations for the output 110 are also possible. The system 100 may also provide as output 112 information suggested to be displayed by a mobile display unit 10 at one or more of the similar geographic areas identified in output 110. For example, the information may be the same as or have some similarities to information which was effectively displayed at one of the similar geographic areas.

Modifications, additions, or omissions may be made to the system 100 without departing from the scope of the present disclosure. For example, the system 100 may include more or fewer elements than those illustrated and described in the present disclosure. For example, the system 100 may include any number of third-party devices associated with any number of entities.

Figure 3:
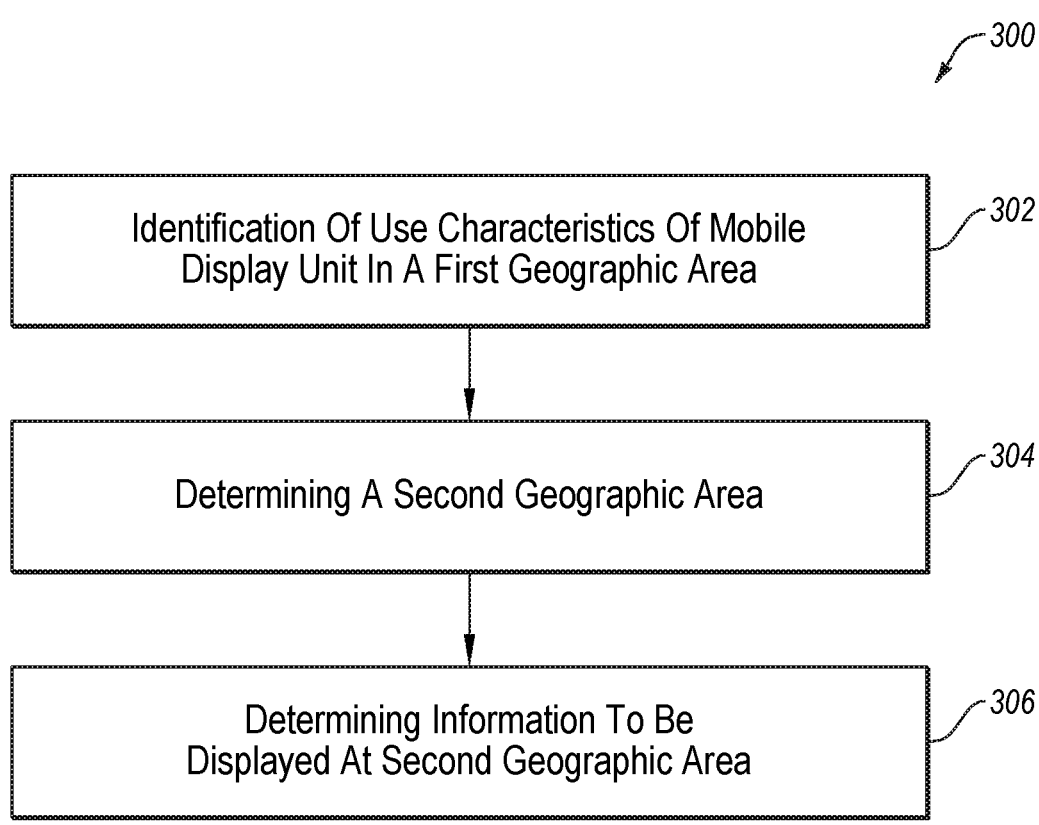
FIG. 3 is a flowchart of an example method for determining parameters of use for a mobile display unit.

FIG. 3 is a flowchart of an example method 300 for determining parameters of use for a mobile display unit 10, including for example a geographic area for its use, a time/day of it should be used, and/or information to be displayed thereby, amongst other possibilities. The method 300 may be arranged in accordance with at least one embodiment described in the present disclosure. One or more of the operations of the method 300 may be performed, in some embodiments, by a device or system, such as one or more elements of the system 100 of FIG. 2. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may include block 302 at which use characteristics of at least one mobile display unit 10 displaying information in a first geographic area may be identified. For example, as indicated above, relevant information may include when and where the mobile display unit 10 is used, the content it displays, and/or its effectiveness. The first geographic area may have a first set of characteristics associated therewith as determined by various information collected relating to the first geographic area. In one form, use characteristics of the mobile display unit 10 in the first geographic area identified at block 302 may include a determination that a number of individuals exposed to the at least one mobile display unit 10 in the first geographic area take one or more predetermined actions in response to the information displayed by the mobile display unit 10 in the first geographic area. In another form, use characteristics of the mobile display unit 10 in the first geographic area identified at block 302 include a determination of effectiveness of the information displayed by the at least one mobile display unit 10 in the first geographic area for achieving a desired response from a number of individuals exposed to the at least one mobile display unit 10 in the first geographic area. The first set of characteristics associated with the first geographic area may include one or more of demographic data, socio-economic data, data associated with time of day, data associated with a day of the week, and weather information. In one form, at least a portion of the first set of characteristics associated with the first geographic area is identified with the at least one mobile display unit 10 in the first geographic area.

At block 304, a second geographic area may be determined based on the set of characteristics associated with the first geographic area. The second geographic area may include a second set of characteristics associated therewith that is at least partially similar to the first set of characteristics associated with the first geographic area. In one form, the second set of characteristics associated with the second geographic area has at least a predetermined degree of similarity with the first set of characteristics associated with the first geographic area. The second set of characteristics associated with the second geographic area may include one or more of demographic data, socio-economic data, data associated with time of day, data associated with a day of the week, and weather information. In one form, at least a portion of the second set of characteristics associated with the second geographic area is identified with the at least one mobile display unit 10 in the second geographic area. In one form, at least one of the characteristics of the second set of characteristics associated with the second geographic area has at least a predetermined degree of similarity with at least one similar characteristic of the first set of characteristics associated with the first geographic area.

At block 306, information to be displayed by a mobile display unit in the second geographic area may be determined. This determination may be based on the identified use characteristics of the mobile display unit in the first geographic area. The method 300 may also include providing the determined information to the mobile display unit 10 in the second geographic area. The method 300 may also include the step of displaying, by a mobile display unit 10 in the second geographic area, the information determined at block 306. The mobile display unit 10 in the second geographic area may be mounted to a vehicle 12. In one form, the information determined at block 306 may be the same as or substantially similar to information displayed by the at least one mobile display 10 unit in the first geographic area. In another form, the information determined at block 306 may be different from the information displayed by the at least one mobile display unit 10 in the first geographic area.

Modifications, additions, or omissions may be made to the method 300 without departing from the scope of the present disclosure. For example, some of the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For example, in some embodiments, the method 300 may include one or more of the operations described above with respect to FIG. 2.

Figure 4:
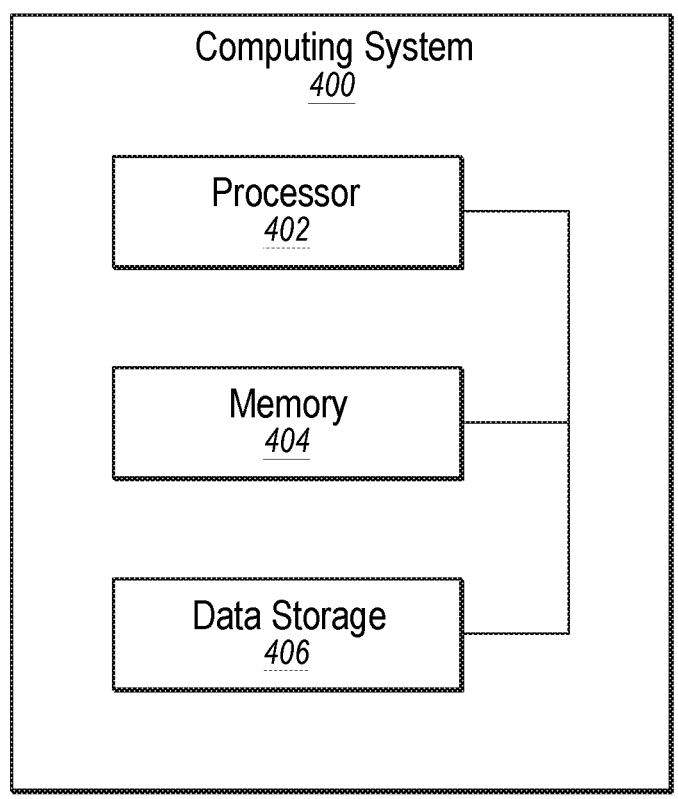
FIG. 4 illustrates an example computing system.

FIG. 4 illustrates a block diagram of an example computing system 400. The computing system 400 may be configured according to at least one embodiment of the present disclosure and may be an example of computing systems that may include or be part of one or more elements of the system 100 of FIG. 2. For example, the system 100 may include one or more computing systems 400. For instance, the computing system 400 may be an example of the computing system 102 of FIG. 2. The computing system 400 may include a processor 402, a memory 404, and a data storage 406. The processor 402, the memory 404, and the data storage 406 may be communicatively coupled. The processor 402 may correspond to the computing system 102 described herein, and the data storage 406 may correspond to the database 106 described herein.

In general, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 402 may include any number of processors configured to, individually or collectively, perform or direct performance of any number of operations described in the present disclosure. Additionally, one or more of the processors may be present on one or more different electronic devices, such as different servers.

In some embodiments, the processor 402 may be configured to interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into memory 404, the processor 402 may execute the program instructions.

The memory 404 and the data storage 406 may include computer-readable storage media for carrying or having computer-executable instructions or data structures stored thereon. Such computer-readable storage media may include any available media that may be accessed by a general-purpose or special-purpose computer, such as the processor 402. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Modifications, additions, or omissions may be made to the computing system 400 without departing from the scope of the present disclosure. For example, in some embodiments, the computing system 400 may include any number of other components that may not be explicitly illustrated or described.

For instance, in some embodiments, the computing system 400 may include a communication unit that includes any component, device, system, or combination thereof that is configured to transmit or receive information over a network. In some embodiments, the communication unit may communicate with other devices at other locations, the same location, or even other components within the same system. For example, the communication unit may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit may permit data to be exchanged with a network and/or any other devices or systems described in the present disclosure. For example, the communication unit may allow the computing system 400 to communicate with other systems, such as computing devices and/or other networks.

Additionally or alternatively, the computing system 400 may include one or more user interfaces in some embodiments. The user interfaces may include any system or device to allow a user to interface with the computing system 400. For example, the interfaces may include a mouse, a track pad, a keyboard, and/or a touchscreen, among other devices or systems. The interfaces may also include a graphical user interface that may be presented on a display that may be included with the computing system 400. The display may be configured as one or more displays, like an LCD, LED, or other type of display. The display may be configured to present content such as video, text, user interfaces, and other data as directed by the processor.

As indicated above, the embodiments described in the present disclosure may include the use of a special purpose or general-purpose computer (e.g., the processor 402 of FIG. 4) including various computer hardware or software modules, as discussed in greater detail below. Further, as indicated above, embodiments described in the present disclosure may be implemented using computer-readable media (e.g., the memory 404 or data storage 406 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   identifying use characteristics of at least one mobile display unit displaying information in a first geographic area, wherein the first geographic area has a first set of characteristics associated therewith;
   identifying at least a second geographic area to display information on a mobile display unit in response to determining a second set of characteristics associated with the second geographic area has at least a predetermined degree of similarity with the first set of characteristics associated with the first geographic area;
   determining, based on the identified use characteristics of the mobile display unit in the first geographic area, information to be displayed by a mobile display unit in the second geographic area, wherein the identified use characteristics of the mobile display unit in the first geographic area include a determination that a number of individuals exposed to the at least one mobile display unit in the first geographic area take one or more predetermined actions in response to the information displayed by the mobile display unit in the first geographic area; and
   in response to determining the second geographic area and determining the information to be displayed by a mobile display unit in the second geographic area, displaying the determined information on a mobile display unit in the second geographic area.

2. The method of claim 1, wherein the mobile display unit in the second geographic area is mounted to a vehicle.

3. The method of claim 1, wherein the determined information is the same as or substantially similar to the information displayed by the at least one mobile display unit in the first geographic area.

4. The method of claim 1, wherein the determined information is different from the information displayed by the at least one mobile display unit in the first geographic area.

5. The method of claim 1, wherein each of the first set of characteristics associated with the first geographic area and the second set of characteristics associated with the second geographic area includes one or more of demographic data, socio-economic data, data associated with time of day, data associated with a day of the week, and weather related information.

6. The method of claim 1, further comprising identifying at least a portion of the first set of characteristics associated with the first geographic area with the at least one mobile display unit in the first geographic area.

7. The method of claim 6, further comprising identifying at least a portion of the second set of characteristics associated with the second geographic area with the mobile display unit in the second geographic area.

8. The method of claim 1, wherein the comparison includes providing a similarity score between the first geographic area and the second geographic area.

9. The method of claim 8, wherein the similarity score exceeds a predetermined threshold.

10. The method of claim 1, wherein the first set of characteristics associated with the first geographic area and the second set of characteristics associated with the second geographic area include one or more spatio-temporal characteristics.

11. The method of claim 10, further comprising determining an estimated time when spatio-temporal characteristics associated with the second geographic area are similar to spatio-temporal characteristics associated with the first geographic area, and displaying the determined information on a mobile display unit in the second geographic area at the estimated time.

12. A system comprising:
    one or more processors; and one or more non-transitory computer-readable media containing instructions which, in response to being executed by the one or more processors, cause the system to perform operations comprising:

identifying use characteristics of at least one mobile display unit displaying information in a first geographic area, wherein the first geographic area has a first set of characteristics associated therewith;

identifying at least a second geographic area to display information on a mobile display unit in response to determining a second set of characteristics associated with the second geographic area has at least a predetermined degree of similarity with the first set of characteristics associated with the first geographic area;

determining, based on the identified use characteristics of the mobile display unit in the first geographic area, information to be displayed by a mobile display unit in the second geographic area, wherein the identified use characteristics of the mobile display unit in the first geographic area include a determination that a number of individuals exposed to the at least one mobile display unit in the first geographic area take one or more predetermined actions in response to the information displayed by the mobile display unit in the first geographic area; and in response to determining the second geographic area and determining the information to be displayed by a mobile display unit in the second geographic area, displaying the determined information on a mobile display unit in the second geographic area.

13. The system of claim 12, wherein the determined information is the same as or substantially similar to the information displayed by the at least one mobile display unit in the first geographic area.

14. The system of claim 12, wherein the operations further comprise:

identifying at least a portion of the first set of characteristics associated with the first geographic area with the at least one mobile display unit in the first geographic area; and identifying at least a portion of the second set of characteristics associated with the second geographic area with the mobile display unit in the second geographic area.

15. The system of claim 12, wherein the identified use characteristics of the mobile display unit in the first geographic area include a determination of effectiveness of the information displayed by the at least one mobile display unit in the first geographic area for achieving a desired response from a number of individuals exposed to the at least one mobile display unit in the first geographic area.

16. The system of claim 12, wherein at least one of the characteristics of the second set of characteristics associated with the second geographic area has at least a predetermined degree of similarity with at least one similar characteristic of the first set of characteristics associated with the first geographic area.

17. One or more non-transitory computer-readable media containing instructions which, in response to being executed by one or more processors, cause a system to perform operations comprising:

identifying use characteristics of at least one mobile display unit displaying information in a first geographic area, wherein the first geographic area has a first set of characteristics associated therewith;

identifying at least a second geographic area to display information on a mobile display unit in response to determining a second set of characteristics associated with the second geographic area has at least a predetermined degree of similarity with the first set of characteristics associated with the first geographic area;

determining, based on the identified use characteristics of the mobile display unit in the first geographic area, information to be displayed by a mobile display unit in the second geographic area, wherein the identified use characteristics of the mobile display unit in the first geographic area include a determination that a number of individuals exposed to the at least one mobile display unit in the first geographic area take one or more predetermined actions in response to the information displayed by the mobile display unit in the first geographic area; and in response to determining the second geographic area and determining the information to be displayed by a mobile display unit in the second geographic area, displaying the determined information on a mobile display unit in the second geographic area.

18. The computer-readable media of claim 17, wherein the operations further comprise providing the determined information to the mobile display unit in the second geographic area.

19. The computer-readable media of claim 17, wherein the operations further comprise providing the determined information to a content provider associated with the mobile display unit in the second geographic area.

20. The computer-readable media of claim 17, wherein the operations further comprise identifying at least a portion of the first set of characteristics associated with the first geographic area and at least a portion of the second set of characteristics associated with the second geographic area.

* * * * *